(12) United States Patent
Zhu

(10) Patent No.: US 12,732,041 B2
(45) Date of Patent: Sep. 8, 2026

(54) GALVANOMETER MOTOR AND LIDAR

(71) Applicant: SUTENG INNOVATION TECHNOLOGY CO., LTD., Shenzhen (CN)

(72) Inventor: Congcong Zhu, Shenzhen (CN)

(73) Assignee: SUTENG INNOVATION TECHNOLOGY CO., LTD., Shenzhen (CN)

( * ) Notice: Subject to any disclaimer, the term of this patent is extended or adjusted under 35 U.S.C. 154(b) by 310 days.

(21) Appl. No.: 18/634,984

(22) Filed: Apr. 14, 2024

(65) Prior Publication Data

US 2025/0007343 A1 Jan. 2, 2025

(30) Foreign Application Priority Data

Jun. 30, 2023 (CN) ........................ 202310800871.0

(51) Int. Cl.

| | |
|---|---|
| ***H02K 1/27*** | (2022.01) |
| ***G01S 7/481*** | (2006.01) |
| ***H02K 1/28*** | (2006.01) |
| ***H02K 11/00*** | (2016.01) |
| ***H02K 11/215*** | (2016.01) |
| ***H02K 11/22*** | (2016.01) |

(52) U.S. Cl.

CPC ............. *H02K 1/28* (2013.01); *G01S 7/4817* (2013.01); *H02K 11/215* (2016.01); *H02K 11/22* (2016.01)

(58) Field of Classification Search

CPC ........ H02K 1/28; H02K 11/215; H02K 11/22; H02K 21/14; H02K 33/00; H02K 1/278; H02K 3/04; H02K 5/22; H02K 2213/03; G01S 7/4817

See application file for complete search history.

(56) References Cited

U.S. PATENT DOCUMENTS

2003/0075769 A1 * 4/2003 Brown ................ G02B 26/105 257/422
2016/0233753 A1 * 8/2016 Benner, Jr. ............ H02K 11/21

* cited by examiner

*Primary Examiner* — Thomas Truong
(74) *Attorney, Agent, or Firm* — BAYES PLLC

(57) ABSTRACT

The present application relates to the field of beam scanning technology and provides a galvanometer motor and a LiDAR. The galvanometer motor includes a stator assembly, a rotor assembly, a tunneling magnetoresistance sensor, a first magnet, and a second magnet. The stator assembly includes a housing and a stator body, while the rotor assembly includes a rotating shaft, a rotor magnet, and an angle limiting member. The rotating shaft is rotatably mounted in the housing around a first shaft line, with a gap between the rotor magnet and the stator body. The rotor magnet rotates around the first shaft line under the magnetic field of the stator body. The tunneling magnetoresistance sensor can map the limited angles formed by the first angle and the second angle into finite position codes.

10 Claims, 12 Drawing Sheets

GALVANOMETER MOTOR AND LIDAR

CROSS-REFERENCE TO RELATED APPLICATION

The present application claims the benefit of priority to Chinese Patent Application No. 202310800871.0, filed on Jun. 30, 2023, which is hereby incorporated by reference in its entirety.

TECHNICAL FIELD

The present application relates to the field of beam scanning technology, particularly to a galvanometer motor and a LiDAR.

TECHNICAL BACKGROUND

The laser radar system requires a rotating mirror motor and a galvanometer motor to respectively drive the rotating mirror and galvanometer to change in the horizontal and vertical directions, thereby altering the laser beam in both horizontal and vertical directions to achieve two-dimensional scanning. The rotating mirror motor drives the rotating mirror to rotate for horizontal scanning, while the galvanometer motor drives the galvanometer to oscillate within a limited angle range to accomplish vertical scanning.

The galvanometer motor drives the galvanometer to oscillate up and down within approximately ±10° range, causing the light beam to reciprocally scan in the vertical direction. During the rotation of the rotating mirror driven by the galvanometer motor, it is crucial to accurately locate the marking positions. The precision of the angular position directly affects the quality of the point cloud, hence the galvanometer motor needs to be equipped with high-resolution sensors to obtain real-time accurate angle information. However, commonly used sensors are photovoltaic sensors, which have the problems of high production costs, temperature-induced drift, and the need for improved resolution. Therefore, galvanometer motors face technical challenges in enhancing angular resolution.

SUMMARY

Embodiments of the present application is to provide a galvanometer motor and a LiDAR, to solve the technical problem of improving the angular resolution of existing galvanometer motors.

Firstly, embodiment of the present application provides a galvanometer motor, including:

- a stator assembly, including a housing and a stator body, where the housing has a rotating limit slot, and the stator body is mounted inside the housing;
- a rotor assembly, including a rotating shaft, a rotor magnet, and an angle limiting member, where: the rotating shaft is rotatably mounted in the housing around a first shaft line, the rotor magnet is fixedly mounted on the rotating shaft, there is a gap between the rotor magnet and the stator body, the rotor magnet rotates around the first shaft line under the magnetic field of the stator body, the angle limiting member is connected to the rotating shaft and located in the rotating limit slot, so that the rotor assembly rotate between a first angle and a second angle;
- a tunneling magnetoresistance sensor mounted on the housing; and
- a first magnet and a second magnet mounted adjacent to each other on the rotating shaft, with a gap between them and the tunneling magnetoresistance sensor, where the magnetic poles of the parts of the first magnet and the second magnet close to the tunneling magnetoresistance sensor are opposite, and as the rotor assembly rotates, the first magnet and the second magnet pass by the tunneling magnetoresistance sensor.

In an embodiment, the first magnet and the second magnet are mounted adjacent to each other along a circumferential direction of the rotating shaft.

In an embodiment, the connecting surface of the first magnet and the second magnet extends along the first shaft line.

In an embodiment, the angle limiting member extends radially along the rotating shaft.

In an embodiment, the angle limiting member and the connecting surface are located on the same radial direction of the rotating shaft.

In an embodiment, the minimum gap between the first magnet and the second magnet and the tunneling magnetoresistance sensor during rotation is 0.4 mm-0.6 mm.

In an embodiment, the galvanometer motor includes a mounting block sleeved on the rotating shaft, with a fan-shaped groove, where the first magnet and the second magnet are fan-shaped magnets spliced and mounted in the fan-shaped groove.

In an embodiment, during the movement of the first magnet and the second magnet, the magnetic field change of the free layer of the tunneling magnetoresistance sensor is −180° to 180°.

In an embodiment, the rotating limit slot defines a rotation angle range of the rotor assembly as 40° to 60°.

In an embodiment, the housing includes an upper cover and a lower shell, distributed along the first shaft line and connected to each other, where the stator body and the rotor magnet are located inside the upper cover, and the tunneling magnetoresistance sensor, the first magnet, and the second magnet are located inside the lower shell. Radially along the rotating shaft, the tunneling magnetoresistance sensor is located outside the first magnet and the second magnet.

In an embodiment, the rotating shaft includes a first shaft and a second shaft, where the first shaft is rotatably provided in the housing, one end extends out of the housing, the other end is fixedly connected to the second shaft, and the rotor magnet is fixedly sleeved on the first shaft.

In an embodiment, the stator body surrounds the rotor magnet, generating an alternating magnetic field to drive the rotor magnet to rotate.

In an embodiment, the stator body is a single-phase winding, including a first straight line segment, a second straight line segment, and a connecting segment, where the connecting segment connects the first and second straight line segments. The first straight line segment has a lead, the housing has a lead-out groove parallel to the first shaft line, and the lead-out groove and the first straight line segment are located on the same radial direction of the rotating shaft.

Embodiments of the present application also provide a LiDAR, including a galvanometer lens and the galvanometer motor according to any one of the above embodiments, where the galvanometer lens is located outside the housing, and one end of the rotating shaft extends out of the housing and is connected to the galvanometer lens.

The rotor magnet rotates around the first shaft line under the magnetic field of the stator body, the angle limiting member is positioned in the rotating limit slot, so that the rotor assembly rotates within a limited angle range between the first and second angles around the first shaft line. The adjacent first magnet and second magnet rotate with the rotor assembly within a limited angle range and pass by the tunneling magnetoresistance sensor. The tunneling magnetoresistance sensor can map the limited angles into finite position codes, for example, ±15 degrees mapped to 0-32767, significantly improving the angular resolution of the rotor assembly.

BRIEF DESCRIPTION OF DRAWINGS

In order to clearly illustrate the technical solution in the embodiments of the present application, a brief description of the drawings required in the embodiments or the description of the related art will be provided below. Obviously, the drawings described below are only some embodiments of the present application.

Figure 1:
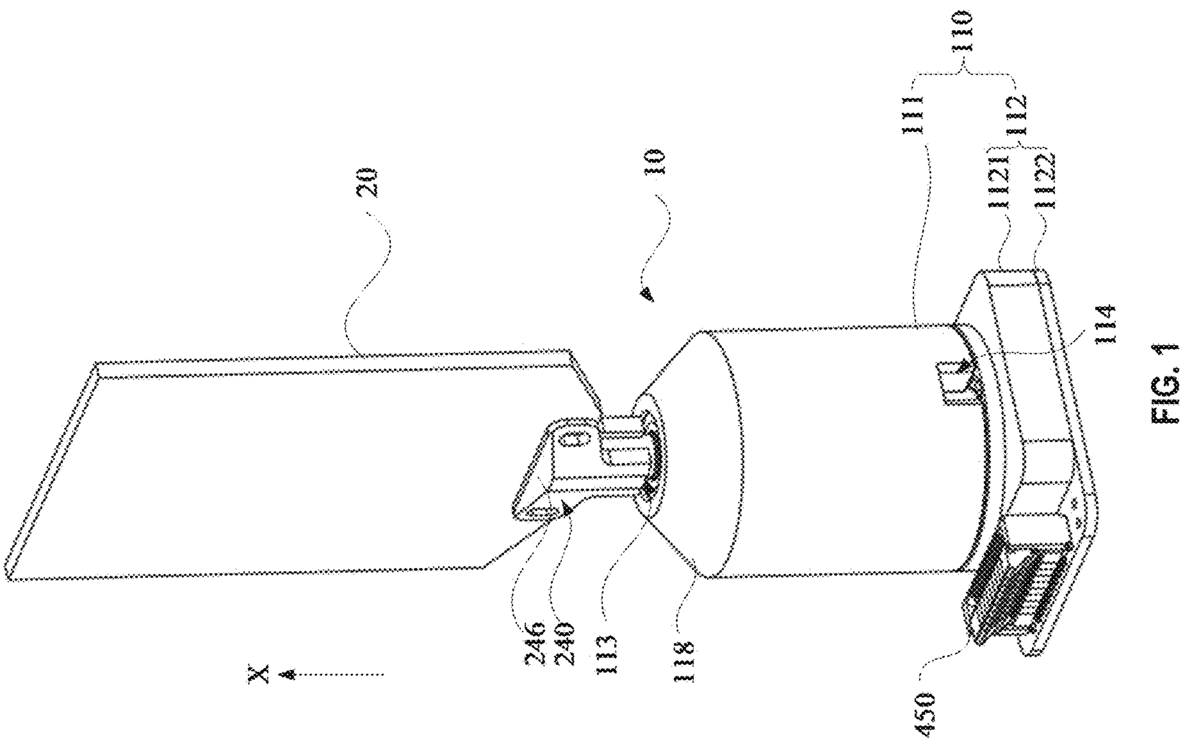
FIG. 1 illustrates a schematic diagram of the structure of a LiDAR, according to some embodiments.

The reference marks in the drawings are as follows:

X, first shaft line;

10, galvanometer motor; 20, galvanometer lens;

100, stator assembly; 110, housing; 111, upper cover; 112, lower shell; 1121, cover; 1122, bottom plate; 1123, extension part; 113, outlet; 114, lead-out groove; 115, rotating limit slot; 1151, first limiting wall; 1152, second limiting wall; 1153, through hole; 1154, reinforcing block; 116, first limit slot; 117, support plate; 118, first avoidance slope; 120, stator body; 121, first straight line segment; 122, second straight line segment; 123, connecting segment; 124, lead;

200, rotor assembly; 210, rotating shaft; 211, first shaft; 212, second shaft; 213, first protrusion; 214, second protrusion; 215, limiting step; 216, first accommodation hole; 217, second accommodation hole; 218, heat dissipation groove; 219, calibration portion; 220, rotor magnet; 230, angle limiting member; 240, mirror clamp; 241, first clamping part; 242, second clamping part; 243, connecting groove; 246, second avoidance inclined surface;

300, tunneling magnetoresistance sensor; 310, pinning layer; 320, insulating layer; 330, free layer;

410, first magnet; 420, second magnet; 430, connecting surface; 440, mounting block; 441, fan-shaped groove; 450, terminal socket; and

510, first bearing; 520, second bearing.

DETAILED DESCRIPTION

The following describes in detail an embodiment of the present application, with examples of the embodiment shown in the drawings, where the same or similar reference numerals represent the same or similar elements or elements with the same or similar functions throughout. The exemplary embodiment described below with reference to the drawings is illustrative and intended to explain the present application.

Reference to "an embodiment" or "embodiment" means incorporating specific features, structures, or characteristics described in conjunction with the embodiment, including in at least an embodiment of the present application. Therefore, the phrases "in an embodiment" or "in some embodiments" appear throughout various parts of the specification, and not all references are to the same embodiment. Additionally, in one or more embodiments, features, structures, or characteristics may be combined.

In the description of the present application, the terms "length," "width," "upper," "lower," "front," "back," "left," "right," "vertical," "horizontal," "top," "bottom," "inner," "outer," and similar indications of orientation or positional relationships are based on the orientation or positional relationships shown in the drawings for the purpose of describing the present application and simplifying the description.

The terms "first" and "second" are used for descriptive purposes only and should not be construed to indicate or imply relative importance or a quantity of the indicated technical features. Therefore, features designated as "first" or "second" may explicitly or implicitly include one or more of such features.

In this application, unless otherwise explicitly specified and limited, terms such as "mounted," "connected," "linked," "fixed," and the like should be interpreted broadly. For example, it can be a fixed connection or a detachable connection, or integral; it can be a mechanical connection or an electrical connection; it can be a direct connection or indirectly connected through an intermediate medium; and it can be communication between two components or the interaction relationship between two components.

The galvanometer motor needs to accurately find the marking position during the rotation of the mirror, and the accuracy of the angular position directly affects the quality of the point cloud. Therefore, the galvanometer motor needs to be equipped with a high-resolution sensor to obtain accurate angle information in real-time.

The photovoltaic sensor has high production costs and is susceptible to temperature drift. Its resolution needs to be improved. The signal output by the photovoltaic sensor is an analog signal, which requires analog-to-digital converter sampling and post-processing, further increasing its usage costs.

In an embodiment, a magnetic encoder sensor is used to detect the angular position of the galvanometer motor. The magnetic encoder sensor is less affected by temperature, can directly output digital signals, and does not require further amplification, filtering, analog-to-digital conversion, etc. Conventional magnetic encoder sensors are designed for 360°, outputting a 16-bit digital code to represent angular position information, and mapping the mechanical angle of 0~360° to 0~65535. Due to the inaccuracy of the last three digits of the digital code, the effective number of bits is 13, resulting in an angular resolution of 0.05°, which still needs improvement.

FIG. 1 illustrates a schematic diagram of the structure of a LiDAR, according to some embodiments.

Refer to FIG. 1. In an embodiment, a LiDAR is provided, including a galvanometer motor 10 and a galvanometer lens 20. The galvanometer motor 10 is connected to the galvanometer lens 20 and the galvanometer motor 10 is used to drive the galvanometer lens 20 to rotate within a limited angle, achieving the scanning of the light beam.

Figure 2:
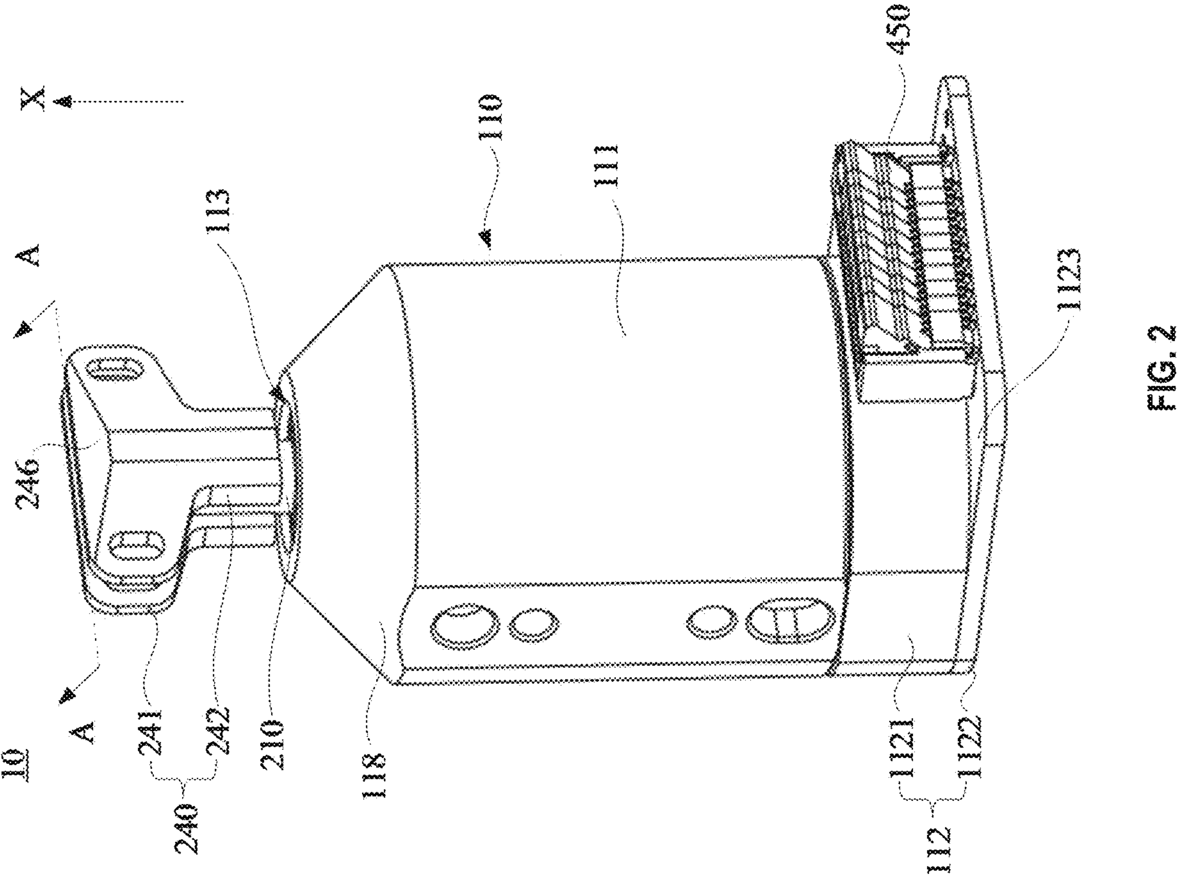
FIG. 2 illustrates a schematic diagram of the structure of a galvanometer motor, according to some embodiments.
Figure 3:
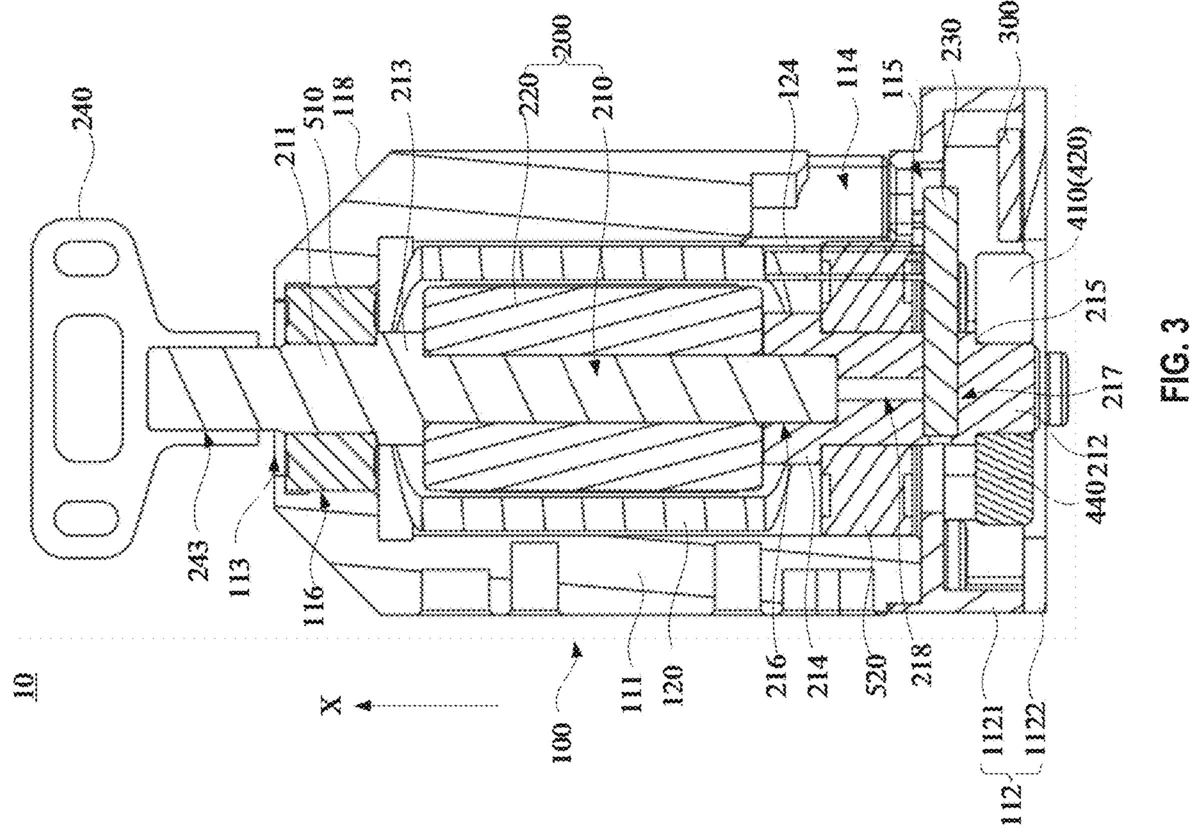
FIG. 3 illustrates a sectional view of the galvanometer motor along line A-A in FIG. 2.

FIG. 2 illustrates a schematic diagram of the structure of a galvanometer motor, according to some embodiments. FIG. 3 illustrates a sectional view of the galvanometer motor along line A-A in FIG. 2.

With reference to FIGS. 2 and 3, in an embodiment, the galvanometer motor 10 provided includes a stator assembly 100, a rotor assembly 200, a tunneling magnetoresistance sensor 300, a first magnet 410, and a second magnet 420.

The stator assembly 100 includes a housing 110 and a stator body 120, where the housing 110 is provided with a rotating limit slot 115, and the stator body 120 is mounted inside the housing 110. The rotor assembly 200 includes a rotating shaft 210, a rotor magnet 220, and an angle limiting member 230. The rotating shaft 210 is rotatably mounted in the housing 110 around a first shaft line X, and the rotor magnet 220 is fixedly mounted on the rotating shaft 210. There is a gap between the rotor magnet 220 and the stator body 120, and the rotor magnet 220 rotates around the first shaft line X under the magnetic field of the stator body 120, causing the entire rotor assembly 200 to rotate around the first shaft line X. In an embodiment, the galvanometer lens 20 is located outside the housing 110, and one end of the rotating shaft 210 extends out of the housing 110 and is connected to the galvanometer lens 20, driving the galvanometer lens 20 to rotate. In an embodiment, one end of the housing 110 has an outlet 113, through which the rotating shaft 210 extends out of the housing 110 and connects to the galvanometer lens 20.

The angle limiting member 230 is connected to the rotating shaft 210 and is located inside the rotating limit slot 115, so that the rotor assembly 200 can rotate between the first angle and the second angle.

Figure 4:
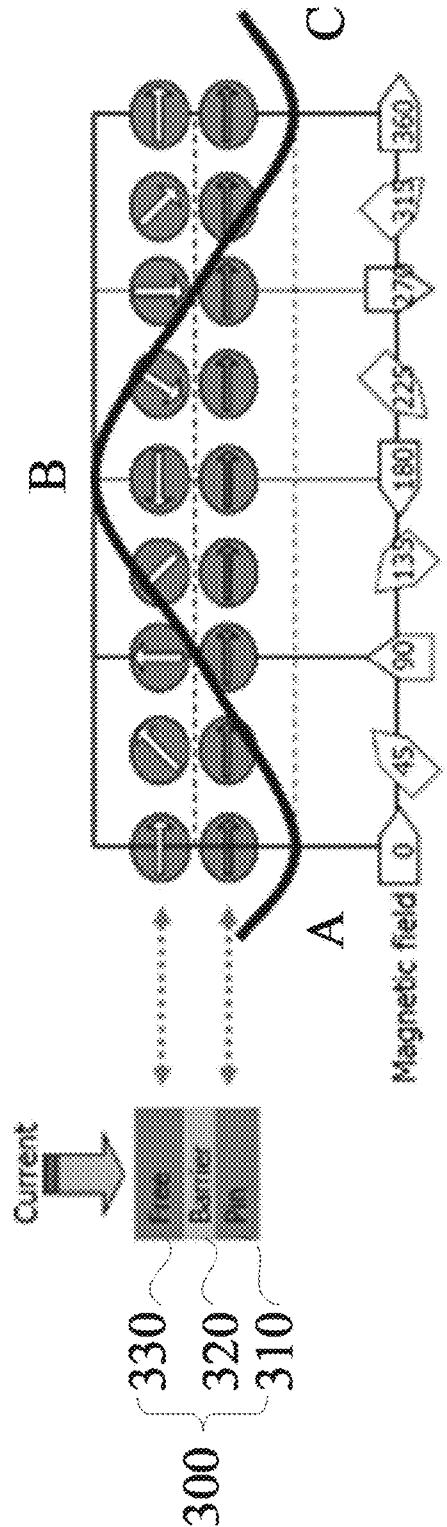
FIG. 4 illustrates a schematic diagram of a tunneling magnetoresistance sensor, according to some embodiments.

FIG. 4 illustrates a schematic diagram of a tunneling magnetoresistance sensor, according to some embodiments.

The tunneling magnetoresistance sensor 300 (Tunneling Magnetoresistance Sensor, TMR sensor) is a type of magnetic resistance sensor that detects changes in the magnetic field caused by instantaneous changes in the magnet. Referring to FIG. 4, the tunneling magnetoresistance sensor 300 includes a pinning layer 310, an insulating layer 320, and a free layer 330. The magnetic moment direction of the pinning layer 310 is fixed, while the magnetic moment direction of the free layer 330 can be influenced by an external magnetic field. When an external magnetic field acts on the tunneling magnetoresistance sensor 300, it causes a change in the magnetic moment direction of the free layer 330, thereby altering the Tunneling Magnetoresistance Effect and resulting in a change in resistance. By measuring the change in resistance, the magnitude and direction of the external magnetic field can be detected. When the magnetic moment direction of the free layer 330 is the same as that of the pinning layer 310, the resistance of the tunneling magnetoresistance sensor 300 is minimal, as at points A and C in FIG. 4. When the magnetic moment direction of the free layer 330 is opposite to that of the pinning layer 310, the resistance of the tunneling magnetoresistance sensor 300 is maximal, as at point B in FIG. 4. In an embodiment, the tunneling magnetoresistance sensor 300 is mounted on the housing 110.

Referring to FIG. 3, the first magnet 410 and the second magnet 420 are mounted adjacent to each other on the shaft 210. Both the first magnet 410 and the second magnet 420 are spaced apart from the tunneling magnetoresistance sensor 300. A portion of the first magnet 410 and a portion of the second magnet 420 close to the tunneling magnetoresistance sensor 300 have opposite magnetic poles. As the rotor assembly 200 rotates, the first magnet 410 and the second magnet 420 pass by the tunneling magnetoresistance sensor 300, causing a magnetic field change of the free layer 330 of the tunneling magnetoresistance sensor 300 to range from −180° to 180°.

In an embodiment, the rotor magnet 220 rotates around the first axis line X under the magnetic field of the stator body 120, and the angle limiting member 230 is limited in the rotating limit slot 115, so that the rotor assembly 200 rotates between a first angle and a second angle within a limited range of angles around the first axis line X. The adjacent first magnet 410 and second magnet 420 move with the rotor assembly 200 within a limited angle range, sequentially approaching and then moving away from the tunneling magnetoresistance sensor 300. The tunneling magnetoresistance sensor 300 can map the limited angle into a limited bit encoding, as opposed to mapping 0-360° into 0-65535, the cooperation between the first magnet 410 and the second magnet 420 with the tunneling magnetoresistance sensor 300 further enhances the angular resolution of the galvanometer motor 10.

The tunneling magnetoresistance sensor includes various types such as AMR (Anisotropy Magneto resistance) sensor, GMR (Giant Magneto resistance) sensor, and tunneling magnetoresistance sensor 300. Compared to other magneto resistance sensors, the tunneling magnetoresistance sensor 300 has higher sensitivity and lower energy consumption, can operate in a wider temperature range, and is less susceptible to external magnetic field interference, with high operational reliability, suitable for LiDAR applications, especially for scenarios with varying environmental temperatures.

There are various implementations for the portion of the first magnet 410 and the portion of the second magnet 420 close to the tunneling magnetoresistance sensor 300 to have opposite magnetic poles.

In some embodiments, the overall magnetic poles of the first magnet 410 are same, and the overall magnetic poles of the second magnet 420 are same, with the magnetic poles of the first magnet 410 and the second magnet 420 being opposite, so that the magnetic poles of the parts of the first magnet 410 and the second magnet 420 close to the tunneling magnetoresistance sensor 300 are also opposite. In an embodiment, referring to FIGS. 5 and 6, the first magnet 410 is a monopole magnet, meaning that the first magnet 410 has only one magnetic pole; or alternatively, the first magnet 410 is a dipole magnet, and magnetic material or magnetic shielding is used to shield one of the magnetic poles, so that only one magnetic pole can generate a magnetic field, while the other magnetic pole is shielded. Similarly, the second magnet 420 can be a monopole magnet or a dipole magnet with one magnetic pole shielded. The magnetic poles of the first magnet 410 and the second magnet 420 are opposite, meaning that if the overall first magnet 410 is a south pole, then the overall second magnet 420 is a north pole; and if the overall first magnet 410 is a north pole, then the overall second magnet 420 is a south pole.

Figure 6:
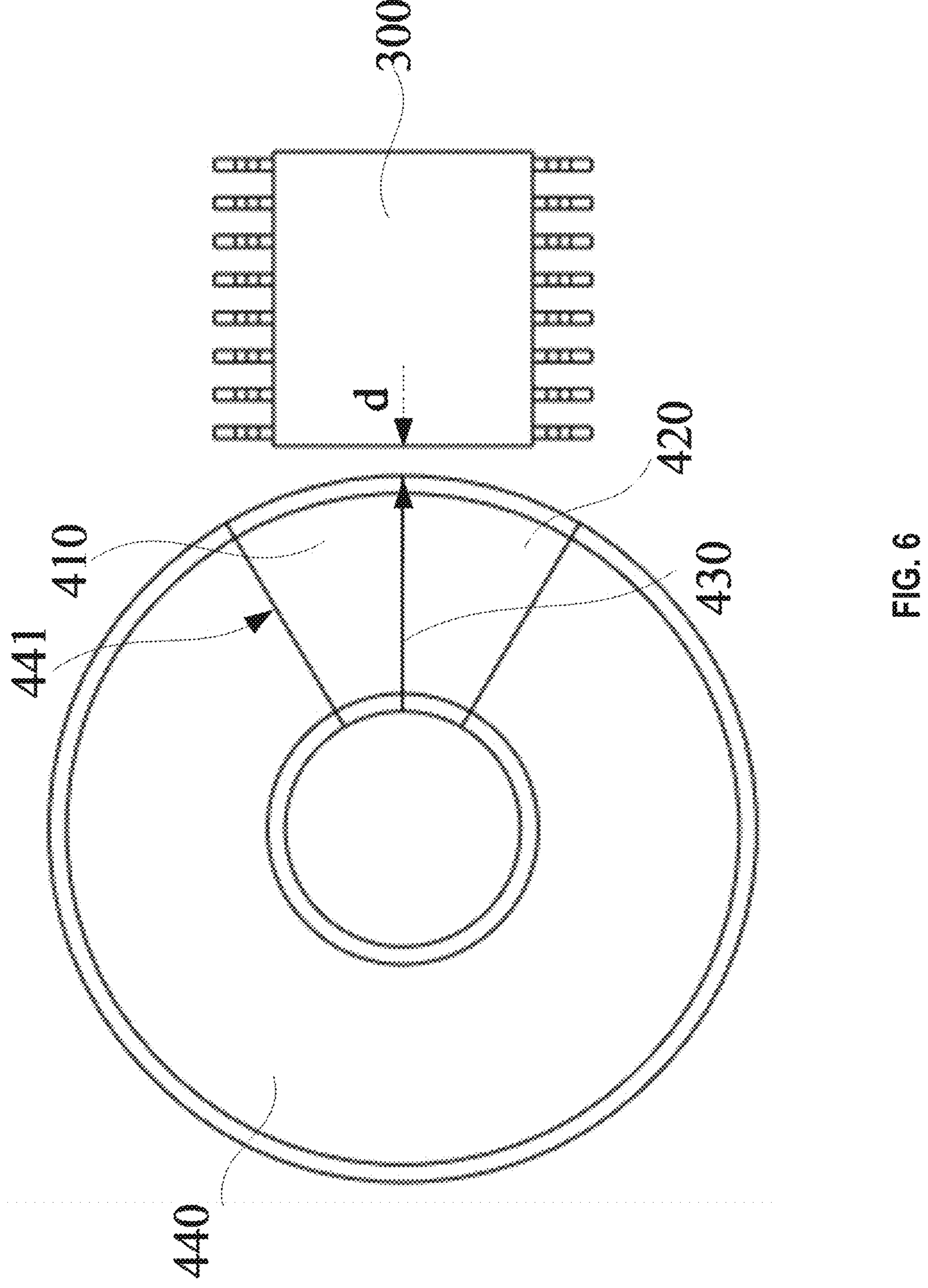
FIG. 6 illustrates a top view of the first magnet and the second magnet with the tunneling magnetoresistance sensor along the first axis line, according to some embodiments.

FIG. 6 illustrates a top view of the first magnet and the second magnet with the tunneling magnetoresistance sensor along the first axis line, according to some embodiments.

In some embodiments, the first magnet 410 is a bipolar magnet with two magnetic poles capable of generating a magnetic field, and the second magnet 420 is a unipolar magnet, a bipolar magnet with one magnetic pole shielded, or a bipolar magnet with two magnetic poles capable of generating a magnetic field. A portion of the magnetic poles of the first magnet 410 and the second magnet 420 to be opposite when close to the tunneling magnetoresistance sensor 300. The magnetic poles of the first magnet 410 and the second magnet 420 facing away from the tunneling magnetoresistance sensor 300 can be opposite or the same, without limitation here. In an embodiment, as shown in FIG. 6, the first magnet 410 and the second magnet 420 are bipolar magnets with two magnetic poles capable of generating a magnetic field. The outer side of the first magnet 410 facing the tunneling magnetoresistance sensor 300 is the south pole, while the inner side of the first magnet 410 is the north pole. The outer side of the second magnet 420 facing the tunneling magnetoresistance sensor 300 is the north pole, and the inner side of the second magnet 420 is the south pole. In some embodiments, the second magnet 420 is a bipolar magnet with two magnetic poles capable of generating a magnetic field, the first magnet 410 is a unipolar magnet, a bipolar magnet with one magnetic pole shielded, or a bipolar magnet with two magnetic poles capable of generating a magnetic field. A portion of the magnetic poles of the first magnet 410 and the second magnet 420 near the tunneling magnetoresistance sensor 300 are opposite, while a portion of the magnetic poles of the first magnet 410 and the second magnet 420 away from the tunneling magnetoresistance sensor 300 can be opposite or the same.

In an embodiment, the adjacent arrangement of the first magnet (410) and the second magnet (420) refers to the direct contact between the first magnet (410) and the second magnet (420), so that a continuous magnetic field is produced by the first magnet (410) and the second magnet (420). The first magnet (410) and the second magnet (420) move synchronously with the rotating shaft (210), causing a continuous change in the magnetic field of the free layer (330) of the tunneling magnetoresistance sensor (300), detecting the corresponding angular position of the rotor assembly (200). In an embodiment, the first magnet (410) and the second magnet (420) can be adjacent to each other by using methods such as adhesive bonding, thermal fusion connection, fastener connection, welding, interlocking, or mere contact.

The first magnet 410 and the second magnet 420 can be integrally formed as a magnetic block. For example, if they are integrated into one magnetic block, it can be magnetized with 12-pole sinusoidal magnetization. The magnetization method can be external magnetization, or they can be separately configured as individual magnetic blocks and then placed adjacent to each other.

In some embodiments, the first magnet 410 and the second magnet 420 are each a magnetic block, magnetized to be a monopole magnet, a bipole magnet shielding one pole, or a bipole magnet capable of generating a magnetic field with both poles, then arranged adjacent to each other, so that a portion of the first magnet 410 and a portion of the second magnet 420 close to the tunneling magnetoresistance sensor 300 have opposite magnetic poles, and a portion of the first magnet 410 and a portion of the second magnet 420 away from the tunneling magnetoresistance sensor 300 can have either opposite or the same magnetic poles. For example, as shown in FIG. 6, the first magnet 410 and the second magnet 420 are manufactured separately and then arranged adjacent to each other, with a portion of the first magnet 410 and a portion of the second magnet 420 close to the tunneling magnetoresistance sensor 300 having opposite magnetic poles.

Figure 8:
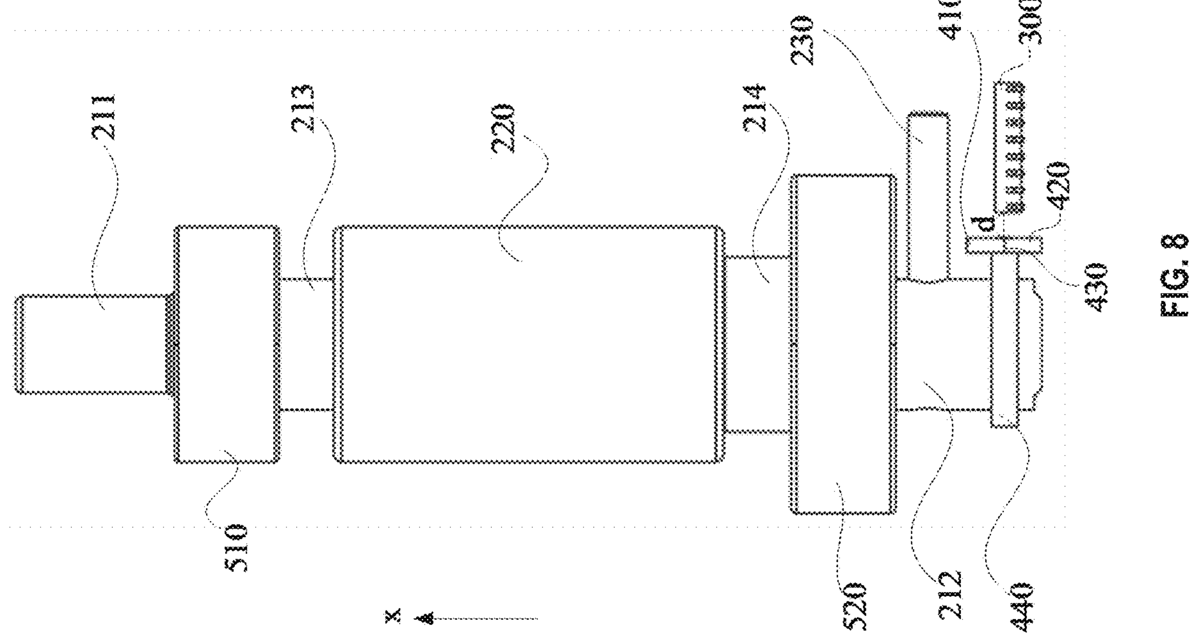
FIG. 8 illustrates still another positional relationship diagram of the first magnet and the second magnet mounted on the rotor assembly with the tunneling magnetoresistance sensor, according to some embodiments.

FIG. 8 illustrates still another positional relationship diagram of the first magnet and the second magnet mounted on the rotor assembly with the tunneling magnetoresistance sensor, according to some embodiments.

In some embodiments, the first magnet (410) and the second magnet (420) are integrally formed as a magnetic block, which is magnetized to have two magnetic poles capable of generating a magnetic field, i.e., the two magnets are respectively the first magnet (410) and the second magnet (420), and both the first magnet (410) and the second magnet (420) are arranged close to the tunneling magnetoresistance sensor (300). Taking FIG. 6 as an example, the first magnet (410) and the second magnet (420) are integrally formed as a magnetic block, and the magnetization direction of this magnetic block is in the circumferential direction of the circle where the first magnet (410) and the second magnet (420) are located, so that both the first magnet (410) and the second magnet (420) are arranged close to the tunneling magnetoresistance sensor (300). Furthermore, combining with FIG. 8, the first magnet (410) and the second magnet (420) are integrally formed as a magnetic block, which is elongated in shape, and the magnetization direction of the magnetic block is along its length, so that both the first magnet (410) and the second magnet (420) can be arranged close to the tunneling magnetoresistance sensor (300).

In an embodiment, whether the first magnet 410 and the second magnet 420 are integral as a magnetic block or separately as individual magnetic blocks, the magnetization direction of the magnetic block can be radial magnetization, axial magnetization, or surface magnetization.

In this application, regardless of whether the first magnet (410) and the second magnet (420) are a magnetic block as a whole or individually, the magnetization direction of the magnetic block can be radial magnetization, axial magnetization, or surface magnetization, without limitation.

Figure 5:
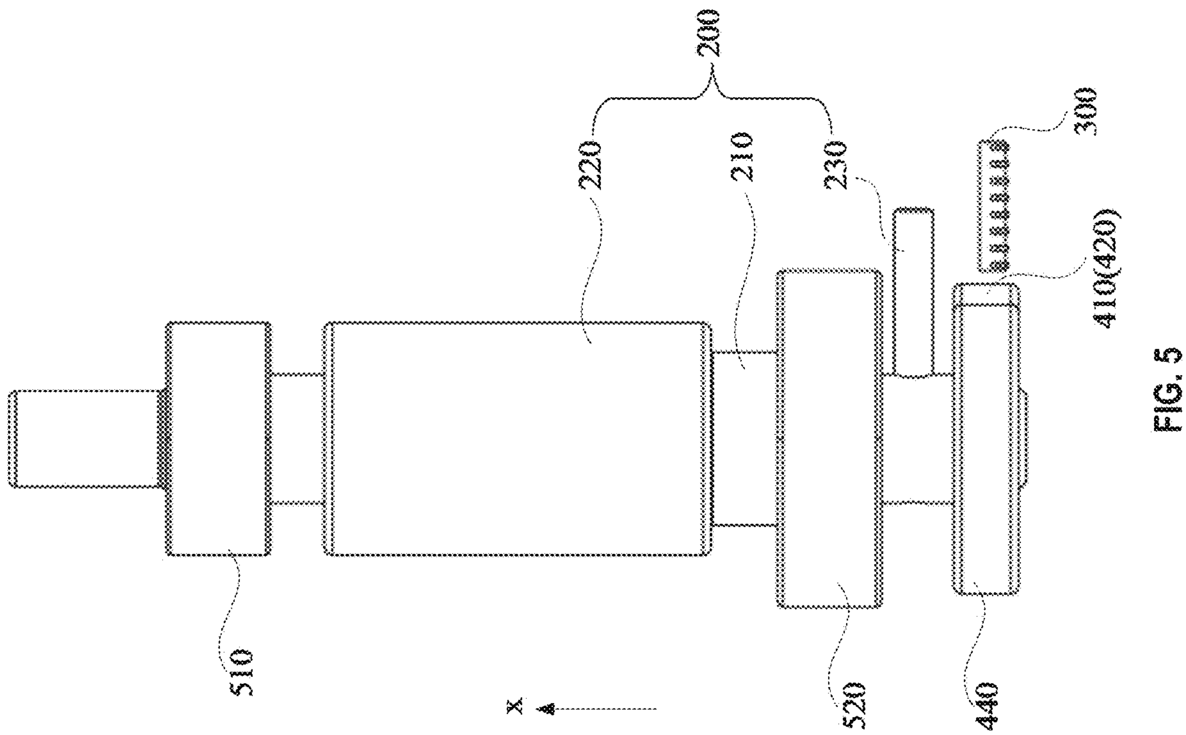
FIG. 5 illustrates a positional relationship diagram of a first magnet and a second magnet mounted on the rotor assembly in an embodiment with the tunneling magnetoresistance sensor, according to some embodiments.
Figure 7:
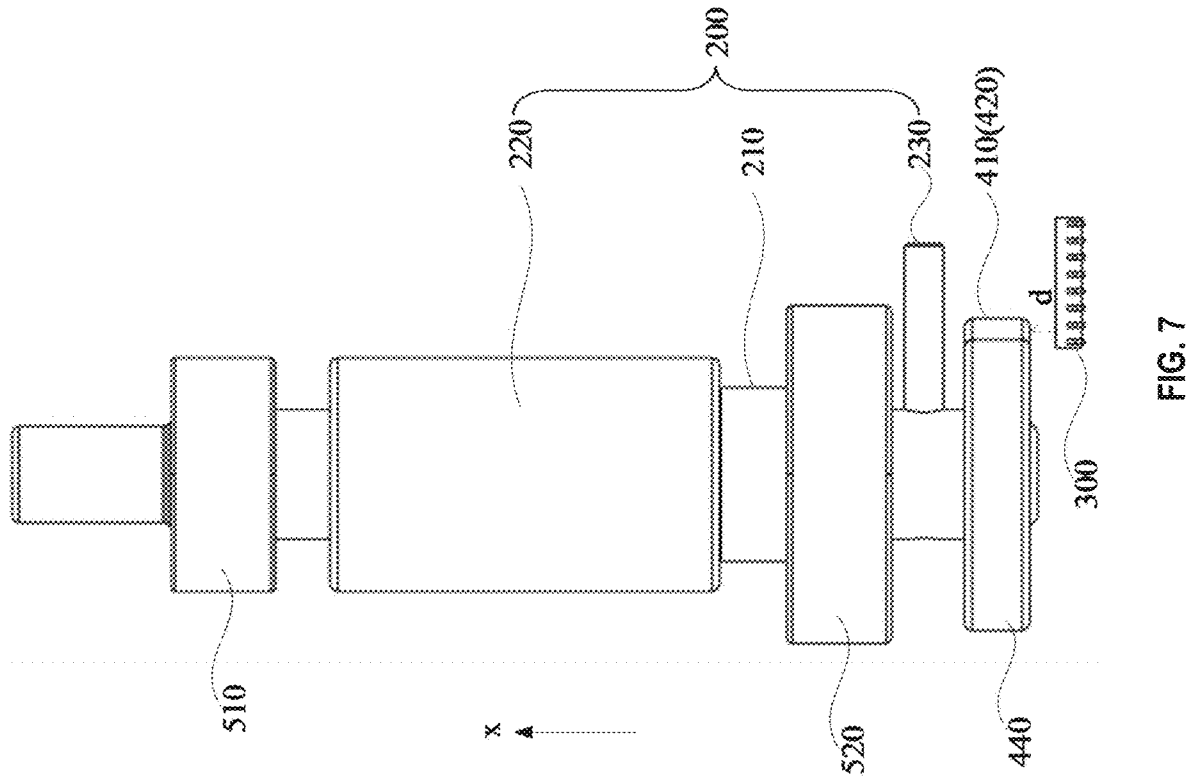
FIG. 7 illustrates another positional relationship diagram of the first magnet and the second magnet mounted on the rotor assembly with the tunneling magnetoresistance sensor, according to some embodiments.

FIG. 5 illustrates a positional relationship diagram of a first magnet and a second magnet mounted on the rotor assembly in an embodiment with the tunneling magnetoresistance sensor, according to some embodiments. FIG. 7 illustrates another positional relationship diagram of the first magnet and the second magnet mounted on the rotor assembly with the tunneling magnetoresistance sensor, according to some embodiments.

In an embodiment, the positioning arrangement of the first magnet (410), the second magnet (420), and the tunneling magnetoresistance sensor (300) can be implemented in various ways. For example, the first magnet (410), the second magnet (420), and the tunneling magnetoresistance sensor (300) are located at the same height on the first axis line X (see FIG. 5), or the first magnet (410) and the second magnet (420) are spaced apart from the tunneling magnetoresistance sensor (300) on the first axis line X (see FIG. 7), which can be positioned above or below the tunneling magnetoresistance sensor (300). For example, the first magnet (410), the second magnet (420), and the tunneling magnetoresistance sensor (300) are spaced radially on the rotating shaft (210) (see FIG. 6), or the first magnet (410), the second magnet (420), and the tunneling magnetoresistance sensor (300) overlap radially on the rotating shaft (210) but have spacing in the direction of the first axis line X (see FIG. 7).

In an embodiment, the trajectories of movement of the first magnet (410) and the second magnet (420) can be implemented in various ways. For example, referring to FIGS. 5 and 7, the first magnet (410) and the second magnet (420) rotate with the rotation of the shaft (210), thereby sequentially approaching and then moving away from the tunneling magnetoresistance sensor (300). In an embodiment, referring to FIG. 8, the first magnet (410) and the second magnet (420) move linearly with the rotation of the shaft (210). The trajectory of this linear motion can be along the first axis line (X direction) or along the tangential direction of the shaft (210), thereby sequentially approaching and then moving away from the tunneling magnetoresistance sensor (300).

In an embodiment, as shown in FIG. 5, the first magnet 410 and the second magnet 420 are fixedly mounted on the rotating shaft 210. The first magnet 410 and the second magnet 420 rotate synchronously with the rotation of the rotating shaft 210. The first magnet 410, the second magnet 420, and the tunneling magnetoresistance sensor 300 are located at the same height on the first shaft line X. The first magnet 410 and the second magnet 420 are radially spaced apart from the tunneling magnetoresistance sensor 300 on the rotating shaft 210. Referring to FIG. 6, the connecting surface 430 of the first magnet 410 and the second magnet 420 face the tunneling magnetoresistance sensor 300. The resistance value of the tunneling magnetoresistance sensor 300 is at point B in FIG. 4. When the first magnet 410 and the second magnet 420 rotate clockwise synchronously with the rotating shaft 210 until a side of the first magnet 410 away from the connecting surface 430 faces the tunneling magnetoresistance sensor 300 directly, the resistance value of the tunneling magnetoresistance sensor 300 is at point A in FIG. 4. When the first magnet 410 and the second magnet 420 rotate counterclockwise synchronously with the rotating shaft 210 until a side of the second magnet 420 away from the connecting surface 430 faces the tunneling magnetoresistance sensor 300 directly, the resistance value of the tunneling magnetoresistance sensor 300 is at point C in FIG. 4. As a result, the first magnet 410 and the second magnet 420 rotate with the rotor assembly 200 within a limited angle and sequentially approach and then move away from the tunneling magnetoresistance sensor 300, allowing the tunneling magnetoresistance sensor 300 to map the limited angle into finite bit encoding.

In an embodiment, as shown in FIG. 8, the first magnet (410) and the second magnet (420) are threadedly mounted on the rotating shaft (210), and the first magnet (410) and the second magnet (420) are limited in the circumferential direction of the rotating shaft (210), so that the first magnet (410) and the second magnet (420) move linearly with the rotation of the rotating shaft (210). In an embodiment shown in FIG. 8, the first magnet (410) and the second magnet (420) move linearly along the first axis line X direction. In other embodiments, the first magnet (410) and the second magnet (420) can move linearly in a direction parallel to the tunneling magnetoresistance sensor (300), i.e., the vertical direction of the paper in FIG. 8. The first magnet (410) and the second magnet (420) can also sequentially approach and then move away from the tunneling magnetoresistance sensor (300). Referring to FIG. 8, the connecting surface (430) of the first magnet (410) and the second magnet (420) is facing the tunneling magnetoresistance sensor (300). At this point, the resistance value of the tunneling magnetoresistance sensor (300) is at point B in FIG. 4. As the first magnet (410) and the second magnet (420) move down with the rotating shaft (210) until the side of the first magnet (410) away from the side of the connecting surface (430) faces the tunneling magnetoresistance sensor (300), the resistance value of the tunneling magnetoresistance sensor (300) is at point A in FIG. 4. As the first magnet (410) and the second magnet (420) move up with the rotating shaft (210) until the second magnet (420) moves away from the side of the connecting surface (430) facing the tunneling magnetoresistance sensor (300), at this point, the resistance value of the tunneling magnetoresistance sensor (300) is at point C in FIG. 4. As a result, the first magnet (410) and the second magnet (420) sequentially approach and then move away from the tunneling magnetoresistance sensor (300) as the rotor assembly (200) rotates, allowing the tunneling magnetoresistance sensor (300) to map a limited angle into a limited bit encoding, for example, +15 degrees can be mapped to 0~32767.

In some embodiments, as shown in FIGS. 6 to 8, the minimum gap d between the first magnet 410 and the second magnet 420 and the tunneling magnetoresistance sensor 300 during rotation is 0.4 mm-0.6 mm. The tunneling magnetoresistance sensor 300 receives a magnetic density of 20 mT-80 mT. Within this magnetic density range, the tunneling magnetoresistance sensor 300 can detect small magnetic field changes and convert them into corresponding resistance changes, exhibiting high sensitivity.

In an embodiment, the minimum gap d is 0.4 mm, 0.45 mm, 0.5 mm, 0.55 mm, and 0.6 mm.

In some embodiments, the minimum gap d can also be 0.3 mm-0.4 mm, or 0.6 mm-0.7 mm.

In an embodiment, as shown in conjunction with FIG. 6, the first magnet (410) and the second magnet (420) are mounted adjacent to each other along the circumferential direction of the rotating shaft (210). The tunneling magnetoresistance sensor (300) can be positioned at the same height on the first shaft line X where the first magnet (410) and the second magnet (420) are located, and can be spaced apart radially on the rotating shaft (210), or can be spaced apart along the first shaft line X. In this case, the first magnet (410) and the second magnet (420) rotate synchronously with the rotating shaft (210), and the rotation angle of the first magnet (410) and the second magnet (420) represents the angle information of the rotor assembly (200) and the galvanometer lens (20) without the need for conversion, so that high accuracy and simple structure is achieved.

In an embodiment, the finite angle of the rotor assembly 200 is divided into two equal parts, with the first magnet 410 and the second magnet 420 corresponding to each part, respectively. For example, if the finite angle of the rotor assembly 200 is 40°, then the central angle corresponding to the first magnet 410 and the second magnet 420 is 20°.

In an embodiment, as shown in FIG. 6, the connecting surface 430 of the first magnet 410 and the second magnet 420 extends along the first axis line X, precisely dividing the angle of the first magnet 410 and the second magnet 420 along the axis of rotation 210. For example, as the first magnet 410 and the second magnet 420 rotate clockwise from the position shown in FIG. 6, the tunneling magnetoresistance sensor 300 starts facing directly towards the first magnet 410. When the first magnet 410 and the second magnet 420 rotate counterclockwise from the position shown in FIG. 6, the tunneling magnetoresistance sensor 300 starts facing directly towards the second magnet 420. The magnetic field changes received by the tunneling magnetoresistance sensor 300 are clear and regular, enhancing the accuracy of angle measurement.

In an embodiment, as shown in FIG. 3, the angle limiting member 230 extends radially along the rotating shaft 210, thereby increasing the contact area with the rotating limit slot 115, so that the rotor assembly 200 to stably and accurately stop at the first angle or the second angle, without deviation due to small contact area, weak limiting force, or wear issues, so that the limiting angles are consistent and symmetrical.

In an embodiment, referring to FIGS. 3 and 6, the angle limiting member 230 and the connecting surface 430 are located on the same radial direction of the rotating shaft 210. In the initial position, the angle limiting member 230 is positioned in the middle of the rotation limit slot 115. When the angle limiting member 230 is at the first angle, the side of the first magnet 410 away from the connecting surface 430 is directly facing the tunneling magnetoresistance sensor 300, and when the angle limiting member 230 is at the second angle, the side of the second magnet 420 away from the connecting surface 430 is directly facing the tunneling magnetoresistance sensor 300. This arrangement ensures that the magnetic field variation and resistance change of the tunneling magnetoresistance sensor 300 are precisely located between points A and C in FIG. 4, making it easy to calculate the corresponding angle information and simplifying subsequent algorithms.

The first magnet 410 and the second magnet 420 can be directly mounted on the rotating shaft 210 or can be mounted on the rotating shaft 210 through an intermediate component.

In an embodiment, as shown in FIGS. 5 and 6, the galvanometer motor 10 further includes a mounting block 440. The mounting block 440 is sleeved on the rotating shaft 210, and the mounting block 440 has a fan-shaped groove 441. The first magnet 410 is a first fan-shaped magnet, and the second magnet 420 is a second fan-shaped magnet. The first magnet 410 and the second magnet 420 are spliced and mounted in the fan-shaped groove 441. The first magnet 410 and the second magnet 420 are positioned within the fan-shaped groove 441, providing high installation stability.

Compared to mounting the first magnet 410 and the second magnet 420 directly on the rotating shaft 210, using the mounting block 440 helps to evenly distribute the load on the rotating shaft 210, preventing any deviation.

In an embodiment, the material of the mounting hole can be plastic, metal, or ceramic.

In an embodiment, as shown in conjunction with FIG. 3, the housing 110 includes an upper cover 111 and a lower shell 112. The upper cover 111 and the lower shell 112 are distributed along the first axis X and connected to each other. The stator body 120 and the rotor magnet 220 are located inside the upper cover 111, while the tunneling magnetoresistance sensor 300, the first magnet 410, and the second magnet 420 are located inside the lower shell 112. The magnetic field coordination between the tunneling magnetoresistance sensor 300 and the first magnet 410 and second magnet 420 is not interfered by the stator body 120 and the rotor magnet 220.

In an embodiment, the upper cover 111 and the lower shell 112 can be detachably connected, and they can be precisely installed through a positioning structure. One end of the upper cover 111 near the lower shell 112 is open, and the upper cover 111 has an outlet 113 at the end away from the lower shell 112. The lower shell 112 has a support plate 117 near one end close to the upper cover 111, and the support plate 117 has a through hole for the rotating shaft 210 to pass through.

In an embodiment, the upper cover 111 and/or the lower shell 112 are further provided with shielding structures for magnetic field shielding, including a shielding layer on the inner wall of the upper cover 111 and a shielding layer on the lower shell 112. The shielding layer of the lower shell 112 can be located on at least one of the side of the support plate 117 near the upper cover 111, the side of the support plate 117 away from the upper cover 111, and the inner wall of the lower shell 112. In an embodiment, the shielding layer is a metal layer.

In an embodiment, radially on the rotating shaft 210, the tunneling magnetoresistance sensor 300 is located outside the first magnet 410 and the second magnet 420, so that the tunneling magnetoresistance sensor 300 mainly receives the magnetic field of the facing portion of either the first magnet 410 or the second magnet 420, while magnetic fields from other directions are filtered out to enhance measurement accuracy.

The dimensions of the galvanometer motor 10 on the first shaft line X is reduced, which helps to lower the installation space requirements of the galvanometer motor 10.

In an embodiment, the lower shell 112 includes a cover 1121 and a bottom plate 1122, with the bottom plate 1122 being mounted on the side of the cover 1121 away from the upper cover 111. In an embodiment, the bottom plate 1122 can be removably mounted on the cover 1121. The tunneling magnetoresistance sensor 300 is mounted on the bottom plate 1122, away from the upper cover 111 and the cover 1121, enabling stable angle measurement and improving operational reliability.

In an embodiment, a portion of the bottom plate 1122 extends to the outside of the cover 1121 to form an extension part 1123, on which a terminal socket 450 is mounted for easy connection to external circuits. Furthermore, the bottom plate 1122 serves as a circuit board, facilitating the electrical connection of the terminal socket 450 and the tunneling magnetoresistance sensor 300 to enable the external output of angle measurement results.

Figure 9:
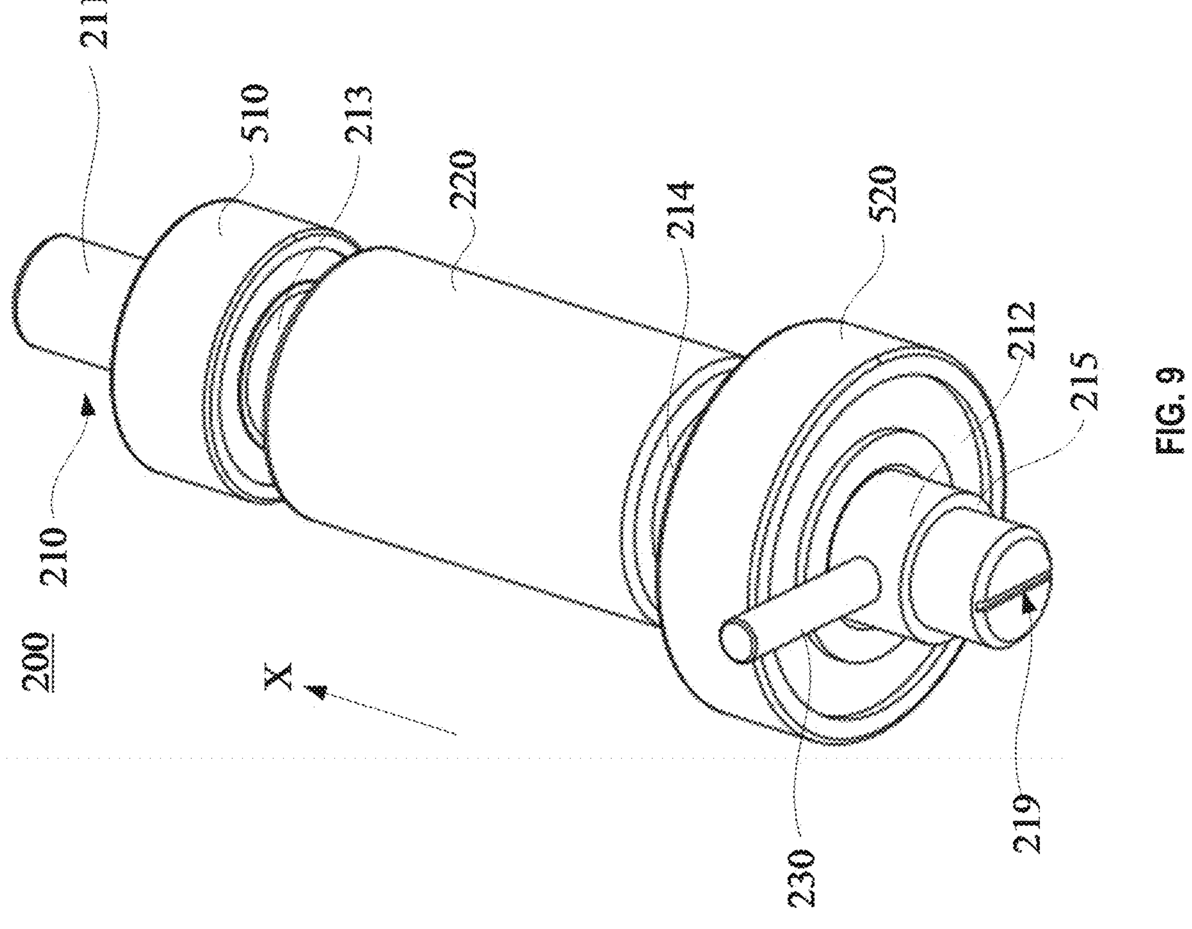
FIG. 9 illustrates a schematic diagram of the rotor assembly with the first bearing and the second bearing mounted, according to some embodiments.
Figure 10:
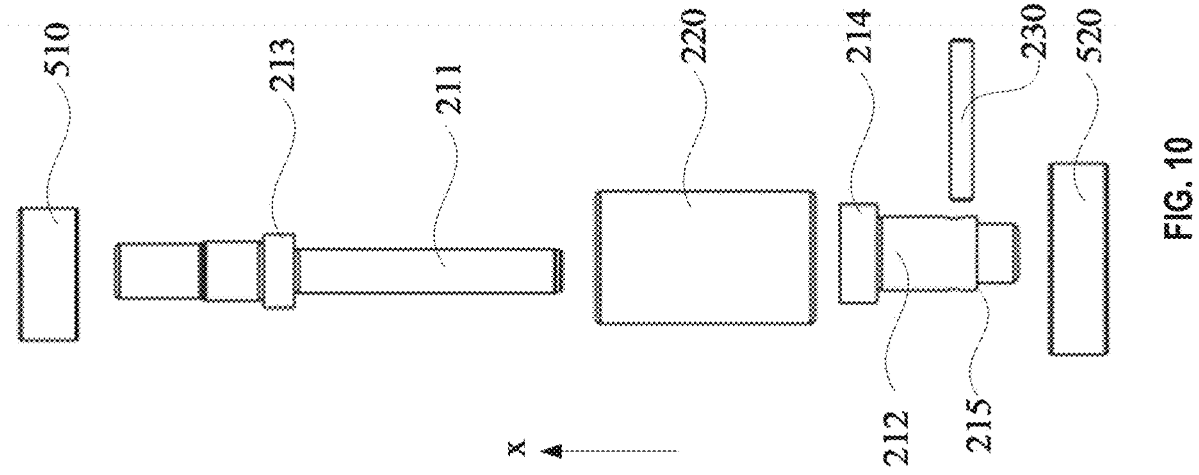
FIG. 10 illustrates an exploded view of FIG. 9.

FIG. 9 illustrates a schematic diagram of the rotor assembly with the first bearing and the second bearing mounted, according to some embodiments. FIG. 10 illustrates an exploded view of FIG. 9.

In an embodiment, as shown in FIGS. 3, 9, and 10, the rotating shaft 210 includes a first shaft 211 and a second shaft 212. The first shaft 211 is rotatably mounted in the housing 110, with one end extending out of the housing 110, and the other end of the first shaft 211 is fixedly connected to the second shaft 212. The rotor magnet 220 is fixedly sleeved on the first shaft 211. By manufacturing the rotating shaft 210 in separate parts, including the first shaft 211 and the second shaft 212, instead of directly producing an integrally formed first shaft 211 and second shaft 212, the complexity of shaft processing is reduced.

In an embodiment, the outer diameter of the end of the second shaft 212 near the first shaft 211 is greater than the outer diameter of the first shaft 211 near the second shaft 212, and they are nested together, reducing the length-to-diameter ratio of the rotor assembly 200 and optimizing the length-to-diameter ratio of the galvanometer motor. At the same time, the rotor magnet 220 is sleeved on the first shaft 211, also reducing the length-to-diameter ratio of the rotor assembly 200.

In an embodiment, the second shaft 212 has a first receptacle hole 216 for insertion of the first shaft 211.

In an embodiment, the rotating shaft 210 has a second accommodation hole 217 for the insertion of the angle limiting member 230. For example, the second shaft 212 has the second accommodation hole 217. The second accommodation hole 217 can extend radially through the second shaft 212 or may not extend through the second shaft 212.

In an embodiment, the bottom of the first accommodation hole 216 is equipped with a heat dissipation groove 218 to facilitate dissipating the heat generated during the rotation of the rotor assembly 200. For example, lubricant may be stored in the heat dissipation groove 218, or the heat dissipation groove 218 may connect the first accommodation hole 216 and the second accommodation hole 217 to achieve external communication of the first accommodation hole 216 with the shaft 210 through the second accommodation hole 217.

In an embodiment, the rotating shaft 210 has a limiting step 215 for positioning and mounting the first magnet 410 and the second magnet 420 or mounting holes. In an embodiment, a limiting step 215 is set at the end of the second shaft 212 away from the first shaft 211 to increase the distance between the first magnet 410 and the second magnet 420 and the stator body 120 and the rotor magnet 220, thereby reducing magnetic field interference.

In an embodiment, a calibration portion 219 is provided on an end face of the second shaft 212 near the limiting step 215 to guide the radial mounting position of the first magnet 410 and the second magnet 420. For example, the calibration portion 219 extends radially along the rotating shaft 210, and the connecting surface 430 of the first magnet 410 and the second magnet 420 is located on the same radial direction as the calibration portion 219. The calibration portion 219 can be a marking line or a calibration groove.

In some embodiments, as shown in FIGS. 3 and 9, the first shaft 211 has a first protrusion 213, the second shaft 212 has a second protrusion 214, and the rotor magnet 220 is located between the first protrusion 213 and the second protrusion 214. One end of the rotor magnet 220 abuts the first protrusion 213, and the other end of the rotor magnet 220 abuts the second protrusion 214, thereby achieving positional alignment of the rotor magnet 220 on the first shaft line X to realize the stable position of the rotor magnet 220 and simplify the assembly positioning process.

In some embodiments, as shown in FIG. 1, a first avoidance slope 118 is set near one end of the housing 110 close to the galvanometer lens 20, so that the outer diameter of the end of the housing 110 gradually decreases towards the direction close to the galvanometer lens 20, to avoid interference with the rotation of the galvanometer lens 20 and the scanning beam.

In an embodiment, as shown in FIGS. 3 and 9, the first shaft 211 is fixedly connected to the galvanometer lens 20 via a rotating mirror clamp 240. In an embodiment, the rotating mirror clamp 240 has a groove, and the galvanometer lens 20 is mounted in the groove. For example, the galvanometer lens 20 is adhesively fixed in the groove.

In an embodiment, the mirror clamp 240 includes a first clamping part 241 and a second clamping part 242, where the first clamping part 241 and the second clamping part 242 are clamped together and fixed to the end of the first shaft 211 extending out of the housing 110. For example, the first clamping part 241 and the second clamping part 242 each have a semi-cylindrical groove, with the semi-cylindrical grooves of the first clamping part 241 and the second clamping part 242 being oppositely arranged to form a connecting groove 243 accommodating the first shaft 211, thereby achieving the positioning and clamping of the first shaft 211.

In an embodiment, the first clamping part 241 and the second clamping part 242 are detachably connected.

In an embodiment, the first clamping portion 241 and the second clamping portion 242 have the same structure, which contributes to reducing the variety of components.

In an embodiment, the first clamping portion 241 and the second clamping portion 242 are provided with a second avoidance inclined surface 246 near one end of the scanning rotating mirror lens 20, so that the outer diameter of the end of the mirror clamp 240 gradually decreases in the direction close to the scanning mirror lens 20, thereby avoiding interference with the rotation of the scanning mirror lens 20 and the scanning beam.

In an embodiment, the first shaft 211, the second shaft 212, and the housing 110 are made of aluminum alloy material, and the angle limiting member 230 can also be an aluminum alloy shaft. Aluminum alloy has good rigidity, with the characteristic of small density compared to metals such as steel and copper, resulting in lower weight, thereby reducing the output density requirements of the galvanometer motor 10. Consequently, by selecting a rotor magnet 220 and stator body 120 with low magnetic field intensity, the length of the rotor magnet 220 and stator body 120 is reduced, thereby reducing the volume of the galvanometer motor 10 and the LiDAR.

In some embodiments, as shown in FIGS. 3 and 10, the galvanometer motor 10 further includes a first bearing 510 and a second bearing 520 spacedly mounted inside the housing 110, where the first bearing 510 and the second bearing 520 are sleeved on the rotating shaft 210 at intervals to support the rotation of the rotating shaft 210. For example, the first bearing 510 is sleeved on the end of the first shaft 211 away from the second shaft 212, and the second bearing 520 is sleeved on the second shaft 212.

In an embodiment, the housing 110 has a first limit slot 116, and the first bearing 510 is placed inside the first limit slot 116 to achieve circumferential limitation of the first bearing 510. The bottom wall of the first limit slot 116 restricts the first bearing 510 from moving towards the galvanometer lens 20 along the first axis X.

In an embodiment, one end of the first bearing 510 abuts against the bottom wall of the first limit slot 116, and the other end of the first bearing 510 abuts against the first protrusion 213 of the first shaft 211, thereby achieving the position limitation of the first bearing 510 in the X-direction of the first shaft line.

In an embodiment, the roughness of the hole wall of the first bearing 510, the roughness of the hole wall of the second bearing 520, the roughness of the surface of the first shaft 211, and the roughness of the surface of the second shaft 212 are less than or equal to 0.1 micrometers, thereby effectively reducing frictional force and minimizing vibration noise.

In some embodiments, the rotor magnet 220 is cylindrical, and the outer diameter of the rotor magnet 220 remains constant along the extension direction of the first axis X, realizing uniform and constant driving force along its length. The rotor magnet 220 has a linear through-hole for fitting onto the first shaft 211. The magnetization of the rotor magnet 220 is achieved through radial magnetization. In an embodiment, in the initial position of the galvanometer motor 10, the connecting surface 430 faces directly towards the tunneling magnetoresistance sensor 300. The connecting surface 430 aligns precisely with the interface of the magnetic poles of the rotor magnet 220.

Figure 11:
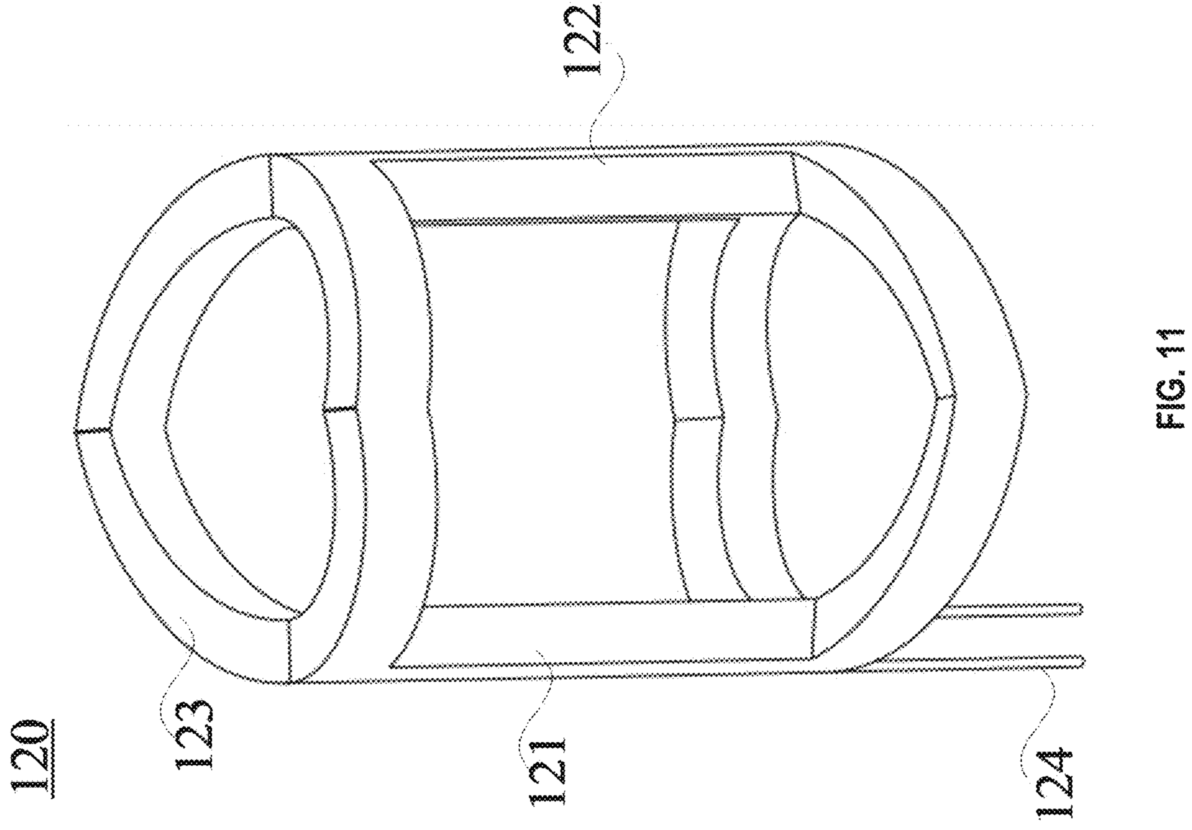
FIG. 11 illustrates a schematic diagram of the stator body, according to some embodiments.

FIG. 11 illustrates a schematic diagram of the stator body, according to some embodiments.

In some embodiments, as shown in FIGS. 3, 10, and 11, the stator body 120 is connected to AC power, generating an alternating magnetic field. The rotor magnet 220 is driven to rotate the entire rotor assembly 200 under the action of the alternating magnetic field, achieving the rotation of the scanning rotating mirror lens 20. It can be understood that in other embodiments, the galvanometer motor 10 adopts a DC motor structure, where the stator body 120 is a magnet, the rotor magnet 220 is a winding, and is connected to DC power, thereby achieving magnetic field variation through brushes.

In an embodiment, as shown in FIGS. 3 and 11, the stator body 120 is a single-phase winding, which includes a first straight line segment 121, a second straight line segment 122, and a connecting segment 123. The connecting segment 123 connects the first straight line segment 121 and the second straight line segment 122. The first straight line segment 121 has a lead 124, and the housing 110 has a lead-out groove 114. The length direction of the lead-out groove 114 is parallel to the first shaft line X, and the lead-out groove 114 and the first straight line segment 121 are located on the same radial direction of the rotating shaft 210, achieving precise positioning of the stator body 120 mounted on the housing 110.

In an embodiment, the lead-out groove 114 is in communication with the outside, and the lead 124 of the stator body 120 is electrically connected to the bottom plate 1122 through the lead-out groove 114.

In an embodiment, the connecting segment 123 is arc-shaped, and the connecting segment 123 extends circumferentially along the inner wall of the housing 110. There are four connecting segments 123 in total. The first straight line segment 121 and the second straight line segment 122 near one end of the galvanometer lens 20 are connected by two of these connecting segments 123. An end of the first straight line segment 121 away from the galvanometer lens 20 and an end of the second straight line segment 122 away from the galvanometer lens 20 are connected by the other two connecting segments 123.

In an embodiment, the lengths of the first straight segment 121 and the second straight segment 122 are 12 mm to 13 mm. When the driving force requirements of the rotor magnet 220 are met, the lengths are minimized to shorten the length of the rotor magnet 220 and the entire galvanometer motor 10 as much as possible.

Figure 12:
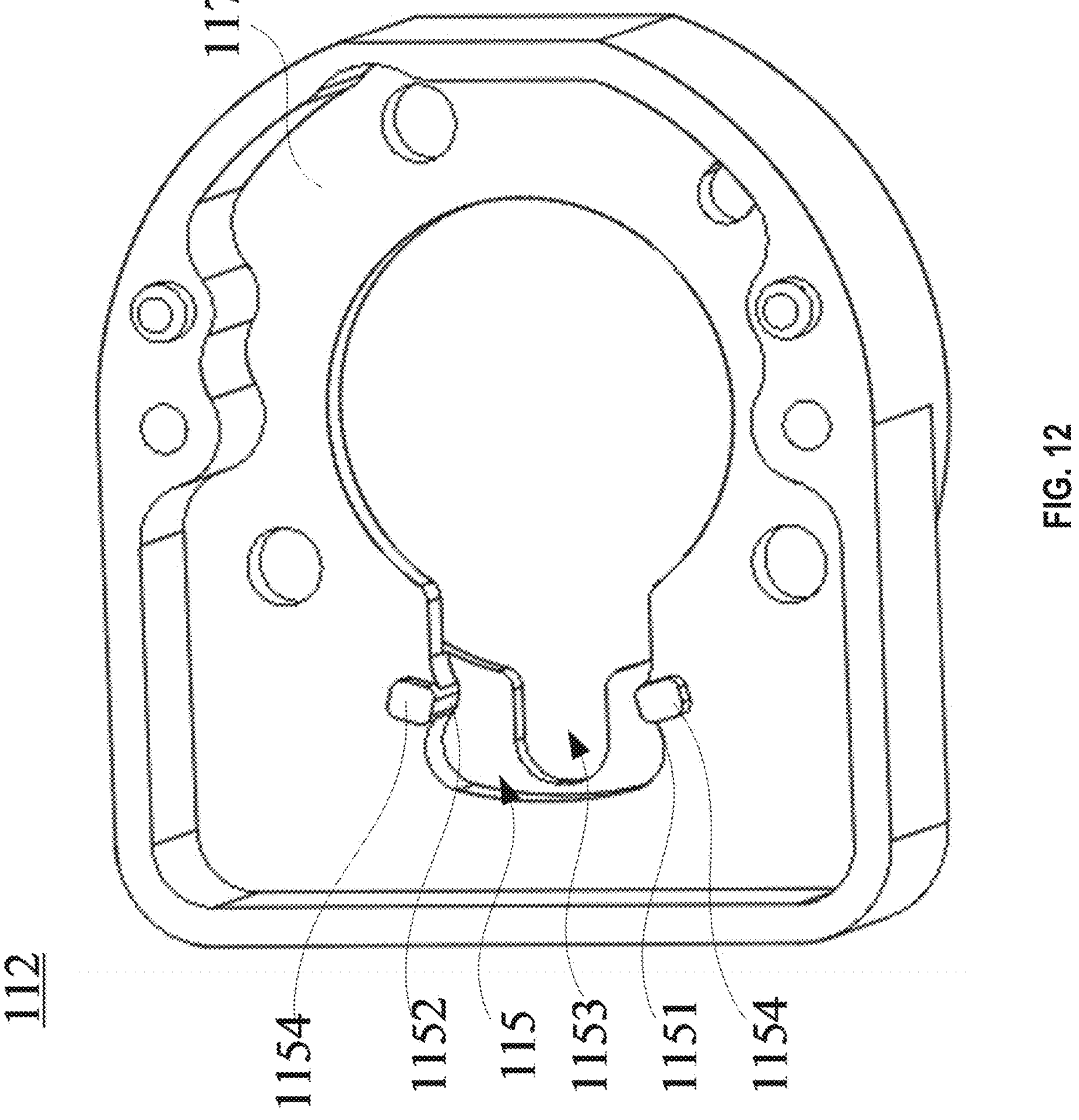
FIG. 12 illustrates a structural schematic diagram of the cover of the lower shell, according to some embodiments.

FIG. 12 illustrates a structural schematic diagram of the cover of the lower shell, according to some embodiments.

In an embodiment, as shown in FIGS. 3 and 12, during the rotation of the first magnet 410 and the second magnet 420, the magnetic field variation of the free layer 330 of the tunneling magnetoresistance sensor 300 is −180° to 180°. The rotation angle range of the rotor assembly 200 is defined as 40° to 60° by the rotation limit slot 115, which meets the rotational requirements of the scanning rotating mirror lens 20 and is significantly smaller than 360°, which is beneficial for improving angular resolution.

In an embodiment, when the rotation angle range is 40°, as the corresponding magnet angle is −20° to 20°, the angular resolution is 40°/(2ˆ13)=0.0049°. When the rotation angle range is 60°, because the corresponding magnet angle is −30° to 30°, the angular resolution is 60°/(2ˆ13)=0.0073°.

In some embodiments, as shown in FIGS. 3 and 12, the housing 110 has a rotating limit slot 115, which includes a first limiting wall 1151 and a second limiting wall 1152 spaced apart along the rotational direction of the rotor assembly 200. The angle limiting member 230 swings with the rotating shaft 210 between the first limiting wall 1151 and the second limiting wall 1152. The rotating limit slot 115 is used to define the swinging angle of the rotor assembly 200, thereby meeting the requirement of small angle rotation for the galvanometer motor to drive the galvanometer lens 20.

In an embodiment the first limiting wall 1151 and the second limiting wall 1152 are flat to avoid severe wear of the angle limiting member 230.

In an embodiment, the end face of the first limit slot 116 is provided with two reinforcing blocks 1154, and the two reinforcing blocks 1154 correspond to the positions of the first limit wall 1151 and the second limit wall 1152 respectively, to prevent deformation of the first limit wall 1151 and the second limit wall 1152 during prolonged collisions.

In an embodiment, the bottom of the first limit slot 116 has a through hole 1153, so that the angle limiting member 230 can pass through. The through hole 1153 is located in the middle of the first limit wall 1151 and the second limit wall 1152, and the width of the through hole 1153 is 1 to 3 times the outer diameter of the angle limiting member 230.

The operating conditions of a LiDAR are complex, with an environmental temperature range generally from −40° C. to 120° C. If temperature drift occurs in the tunneling magnetoresistance sensor 300, the galvanometer motor 10 can calibrate the tunneling magnetoresistance sensor 300 by mechanical impact with the angle limiting member 230 against the first limiting wall 1151 and the second limiting wall 1152, thereby improving control accuracy.

In an embodiment, when the galvanometer motor 10 is started, mechanical calibration is performed using the angle limiting member 230 to respectively engage in hard limits between the first limit wall 1151 and the second limit wall 1152 to achieve angle signal alignment. For example, at the initial moment, control the angle limiting member 230 to rotate to the first limit wall 1151 and the second limit wall 1152, perform mechanical limiting, read the measurement value corresponding to the tunneling magnetoresistance sensor 300, calibrate the tunneling magnetoresistance sensor 300 based on the measurement value, so that the readings of the angle limiting member 230 at the mechanical limits of the first limit wall 1151 and the second limit wall 1152 are both half of the total mechanical travel. In other words, the total mechanical travel is +20°. After the impact, it can be set that the angle limiting member 230 corresponds to −20° for the tunneling magnetoresistance sensor 300 at the first limit wall 1151, and +20° for the tunneling magnetoresistance sensor 300 at the second limit wall 1152. When the angle limiting member 230 is in the middle of the first limit wall 1151 and the second limit wall 1152, the angle calibration of the tunneling magnetoresistance sensor 300 is zero. At this point, the first limit wall 1151 and the second limit wall 1152 are symmetrical about the angle limiting member 230. Even considering wear, it remains symmetrical, in order to achieve the accuracy and reliability of the position of the central zero point.

What is claimed is:

1. A galvanometer motor, comprising:

a stator assembly, wherein the stator assembly comprises a housing and a stator body, the housing is provided with a rotating limit slot, and the stator body is mounted inside the housing;

a rotor assembly, wherein the rotor assembly comprises a rotating shaft, a rotor magnet, and an angle limiting member, the rotating shaft is rotatably mounted in the housing around a first shaft line, the rotor magnet is fixedly mounted on the rotating shaft, there is a gap between the rotor magnet and the stator body, the rotor magnet rotates around the first shaft line under an action of a magnetic field of the stator body, the angle limiting member is connected to the rotating shaft, and the angle limiting member is located in the rotating limit slot, so that the rotor assembly rotates between a first angle and a second angle;

a tunneling magnetoresistance sensor, wherein the tunneling magnetoresistance sensor is mounted on the housing; and a first magnet and a second magnet, wherein the first magnet and the second magnet are mounted adjacent to each other on the rotating shaft, there is a gap between the first magnet and the second magnet and the tunneling magnetoresistance sensor, a portion of the first magnet and a portion of the second magnet close to the tunneling magnetoresistance sensor are opposite in magnetic pole, and the first magnet and the second magnet rotate with the rotor assembly to move past the tunneling magnetoresistance sensor.

2. The galvanometer motor according to claim 1, wherein the first magnet and the second magnet are mounted adjacent to each other along a circumferential direction of the rotating shaft.

3. The galvanometer motor according to claim 2, wherein: a connecting surface of the first magnet and the second magnet extends along the first shaft line; the angle limiting member extends along a radial direction of the rotating shaft; and the angle limiting member and the connecting surface are located on a same radial direction of the rotating shaft.

4. The galvanometer motor according to claim 1, wherein a minimum gap between the first magnet and the tunneling magnetoresistance sensor and a minimum gap between the second magnet and the tunneling magnetoresistance sensor during rotation are 0.4 mm-0.6 mm.

5. The galvanometer motor according to claim 1, further comprising a mounting block, wherein: the mounting block is sleeved on the rotating shaft; the mounting block is provided with a fan-shaped groove; the first magnet is a first fan-shaped magnet, and the second magnet is a second fan-shaped magnet; and the first magnet and the second magnet are spliced and mounted in the fan-shaped groove.

6. The galvanometer motor according to claim 1, wherein during movement of the first magnet and the second magnet; a change in a magnetic field of a free layer of the tunneling magnetoresistance sensor is −180°-180°; and the rotating limit slot defines a rotation angle range of the rotor assembly as 40°-60°.

7. The galvanometer motor according to claim 1, wherein: the housing comprises an upper cover and a lower shell; the upper cover and the lower shell are distributed along the first shaft line and connected to each other; the stator body and the rotor magnet are located inside the upper cover; the tunneling magnetoresistance sensor, the first magnet, and the second magnet are located inside the lower shell; and along a radial direction of the rotating shaft, the tunneling magnetoresistance sensor is located outside the first magnet and the second magnet.

8. The galvanometer motor according to claim 1, wherein: the rotating shaft comprises a first shaft and a second shaft; the first shaft is rotatably provided in the housing; one end of the first shaft extends out of the housing, and the other end of the first shaft is fixedly connected to the second shaft; and the rotor magnet is fixedly sleeved on the first shaft.

9. The galvanometer motor according to claim 1, wherein the stator body surrounds the rotor magnet, and the stator body generates an alternating magnetic field for driving the rotor magnet to rotate; and wherein: the stator body is a single-phase winding; the single-phase winding comprises a first straight line segment, a second straight line segment, and a connecting segment; the connecting segment connects the first straight line segment and the second straight line segment; the first straight line segment is provided with a lead; the housing is provided with a lead-out groove; and a length direction of the lead-out groove is parallel to the first shaft line, and the lead-out groove and the first straight line segment are located on a same radial direction of the rotating shaft.

10. A LIDAR, wherein the LiDAR comprises a galvanometer lens and a galvanometer motor;

wherein the galvanometer motor comprises:

a stator assembly, wherein the stator assembly comprises a housing and a stator body, the housing is provided with a rotating limit slot, and the stator body is mounted inside the housing;

a rotor assembly, wherein the rotor assembly comprises a rotating shaft, a rotor magnet, and an angle limiting member, the rotating shaft is rotatably mounted in the housing around a first shaft line, the rotor magnet is fixedly mounted on the rotating shaft, there is a gap between the rotor magnet and the stator body, the rotor magnet rotates around the first shaft line under an action of a magnetic field of the stator body, the angle limiting member is connected to the rotating shaft, and the angle limiting member is located in the rotating limit slot, so that the rotor assembly rotates between a first angle and a second angle;

a tunneling magnetoresistance sensor, wherein the tunneling magnetoresistance sensor is mounted on the housing; and a first magnet and a second magnet, wherein the first magnet and the second magnet are mounted adjacent to each other on the rotating shaft, there is a gap between the first magnet and the second magnet and the tunneling magnetoresistance sensor, a portion of the first magnet and a portion of the second magnet close to the tunneling magnetoresistance sensor are opposite in magnetic pole, and the first magnet and the second magnet rotate with the rotor assembly to move past the tunneling magnetoresistance sensor; and wherein the galvanometer lens is located outside the housing, and one end of the rotating shaft extends out of the housing and is connected to the galvanometer lens.

* * * * *